Feb. 28, 1933.  E. P. STEIN  1,899,296
VALVE
Filed Aug. 17, 1929
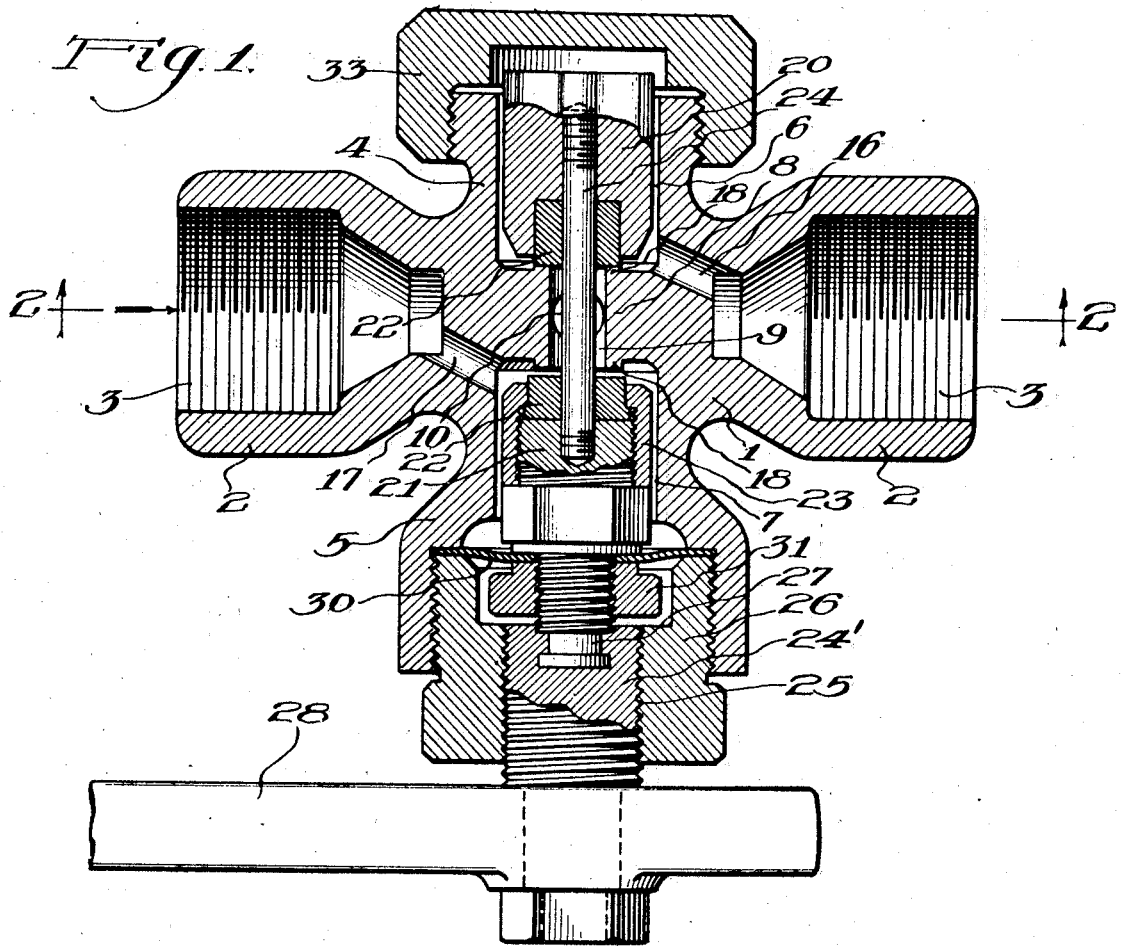
Fig. 1.
Fig. 2.
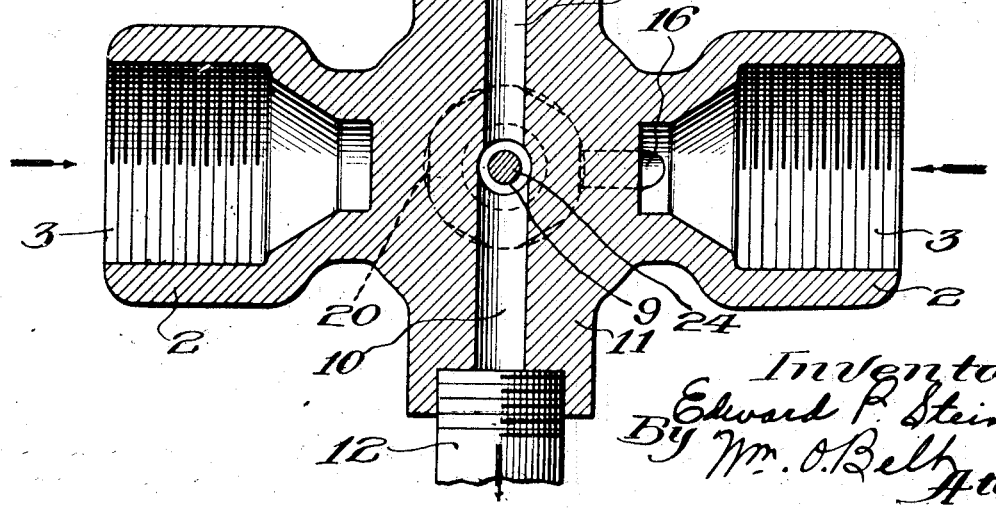
Inventor.
Edward P. Stein
By Wm. O. Belt
Atty.

Patented Feb. 28, 1933

1,899,296

UNITED STATES PATENT OFFICE

EDWARD P. STEIN, OF CHICAGO, ILLINOIS, ASSIGNOR TO THE BASTIAN-BLESSING COMPANY, OF CHICAGO, ILLINOIS, A CORPORATION OF ILLINOIS

VALVE

Application filed August 17, 1929. Serial No. 386,508.

My invention relates to valves of the kind more particularly adapted for use on tanks or cylinders for petroleum gas, and one of the objects of my invention is to provide a novel and efficient valve for this purpose.

Another object of my invention is to provide a two way valve for connection with two individual tanks and having a common outlet, the valve being arranged in such manner that only one of the tanks can be connected at a time to the outlet.

Other objects of my invention will appear hereinafter.

Referring to the accompanying drawing Fig. 1 is a section through a valve structure embodying my invention; and Fig. 2 is a section transverse to that of Fig. 1 on the line 2—2 of Fig. 1.

The valve body 1 has two bosses or extensions 2 which are disposed oppositely of each other. These bosses are hollow and are threaded at 3 for connection, by means of suitable pigtails or pipes to the gas tanks or cylinders. The valve shown in the drawing is intended to serve two cylinders and each cylinder is individually connected to a boss 2. The body also has two bosses or extensions 4 and 5 which are disposed at right angles to the axis of the threaded bosses 2. The bosses 4 and 5 are bored out to form recesses or chambers 6 and 7 which are cylindrical in shape and are axially aligned. They terminate short of each other within the body of the valve to provide a central partition 8 which separates the two chambers except for the cylindrical port or passage 9 which extends through the partition, is cylindrical in shape and disposed concentrically with the axis of the chambers. The outlet port for the valve is formed by a passage 10 which leads from the central passage 9 through another boss 11 on the body which is adapted for connection to a pipe 12 leading to the point of consumption of the gas. Another passage 13 aligned with the passage 10 extends from the passage 9 through a boss 14 for connection with a suitable pressure gauge 15, Fig. 2. One of the hollow bosses 2 connected to the tank, communicates with the recesses or chamber 6 through the medium of a diagonally disposed inlet port or passage 16, and the other boss 2 is connected by a similar inlet port 17 to the recess 7.

Each side of the partition has an annular seat 18 surrounding the end of the passage 9. In the recesses 6 and 7 the valve members 20 and 21 are positioned. These valve members have seat members 22 embedded in their ends adjacent the annular seats 18 and adapted to co-operate with the seats 18 to open and close the passage between the valve chambers 6 and 7 and the central passage 9. The seat members 22 are preferably of soft metal so that they will properly adapt themselves to the seats 18. The seat member 22 of valve member 20 is set with a force fit in a recess in said valve member. The seat member 22 of valve member 21, however, is flanged and is held in place by a flanged collar 23 which is threaded on the end of the valve member.

The two valve members are fastened together in axial alignment by the valve stem 24 which extends through the passage 9 and is screwed into threaded central bores in the valve members so that the valve members will move longitudinally in unison as a unit. Thus when the valve unit is moved in one direction it closes the passage from chamber 6 to the central passage 9, and opens chamber 7 to this passage. When moved in the opposite direction the unit will close the chamber 7 to passage 9 and open chamber 6 thereto. In this manner only one of the inlets from the cylinders can be connected to the outlet port 10 at one time.

The movement of the valve unit with respect to its seats is accomplished by the rotation of the operating stem 24' in the manner which constitutes the subject matter of Patent 1,662,291 issued March 13, 1928. The operating stem is moved longitudinally by means of the threads 25 in the bushing 26. It is rotatably connected at 27 to the valve member 21 and has a suitable operating lever or handle 28. A gas tight packing is obtained by the diaphragm 30 which is clamped to the valve member 21 by the nut 31 on the threaded portion of the valve member. The outer edge of the diaphragm is clamped between the inner end of the nut 26 and a shoulder in the boss 5, this packing nut being threaded into the boss. The boss 4 in which the valve member 20 is contained has a removable cap 33 which closes the outer end of the valve chamber 6 but permits access to the interior of the valve as desired.

The valve members are so mounted on the valve stem 24 that 180° movement of the handle 28 will suffice to move one valve member from closed to open position and, as above described, to oppositely move the other valve member. The bosses 2, 2 are oppositely disposed on the body, that is, these bosses are disposed in diametrical opposition or are spaced apart 180°. The handle is so attached that the above described 180° movement will be from a position below one boss into a position below the other boss, and the valves are preferably so arranged that the handle will extend in the direction of the boss with which the valve structure has open communication and thus the handle serves as an indicating means. This is very advantageous for the intended use of this valve, namely in connection with gas supply tanks, as a glance at the handle will indicate the tank from which the gas is being withdrawn.

Changes may be made in the form, construction and arrangement of the invention of the safety means to adapt it for valves of different kinds, and for other purposes, and I reserve the right to make all such changes as fairly fall within the scope of the following claims.

I claim:

1. A two-way valve comprising a body having two axially aligned valve chambers therein, a division wall between said chambers having a passage therein extending between said chambers, said division wall having an outlet port therein communicating with said passage, axially aligned bosses on said body extending substantially at right angles to the axial extent of said valve chambers, said body having a bore therein extending between one of said bosses and one of said valve chambers and having another bore therein extending between the other of said bosses and the other of said valve chambers, a valve unit comprising a valve member in each chamber, means extending through said passage and connecting said valve members for movement in unison, a removable cap closing the end of one of said valve chambers, a diaphragm for closing the end of the other of said chambers, a threaded bushing for retaining said diaphragm in position, means connecting said valve unit to said diaphragm, a screw member mounted in said threaded bushing and connected to said diaphragm, and a handle connected to said screw member and adapted to move said screw member to move said valve unit whereby said valve members will be moved in unison into a position wherein they are disposed to close communication between one of said bosses and said outlet port and to open communication between the other of said bosses and said outlet port whereby said handle may be moved to move said valve unit whereby communication will be opened between the one of said bosses previously out of communication with said outlet port and will be closed to the other of said bosses previously in communication with said outlet port.

2. A two-way valve including a valve body having oppositely disposed bosses thereon and aligned portions intermediate said bosses and extending at right angles thereto and providing valve chambers, said valve body having a passage therein interconnecting said valve chambers and having an outlet port communicating with said passage, said valve body having an opening therein extending between one of said bosses and one of said valve chambers and having another opening therein extending between the other of said bosses and the other of said valve chambers whereby communication may be established through said openings, chambers, and passage between said bosses and said outlet port, valve members in said chambers, means interconnecting said valve members for movement in unison, operating means for said valve members and including a rotatable part movable through a 180° arc to so position the valve members that communication is established between one of said bosses and the outlet port when communication between the other of the bosses and the outlet port is closed, and a handle movable from alignment with one of said bosses into alignment with the other of said bosses and so connected to said rotatable part that it extends in the direction of the boss in communication with said outlet port.

3. A two-way valve comprising a body having two axially aligned valve chambers, a division wall between said chambers embodying a passage communicating with each chamber, a valve seat on said division wall in each of said chambers about the ends of the passage, a valve unit comprising a valve member in each of said chambers, one of said valve members having a seat member embedded therein for cooperation with the adjacent seat, said valve unit including a valve stem extended through said embedded seat member and having one end thereof connected to the valve member carrying said embedded seat member, said valve stem extending through said passage into the other chamber, the other valve member in this other valve chamber having an opening therein, a second seat member mounted in said opening and adapted for cooperation with the adjacent valve seat, a nut in the other valve member and connecting said valve stem to said other valve member and retaining the second seat member in said other valve member, and means connected to said valve unit for operating the valve unit to engage the embedded seat member with its cooperating valve seat and to simultaneously disengage the second seat member from its valve seat or to disengage the embedded seat member from its valve seat simultaneously with the engagement of the second valve member with its cooperating valve seat.

EDWARD P. STEIN.